United States Patent [19]

Hans et al.

[11] 4,294,215
[45] Oct. 13, 1981

[54] FUEL INJECTION SYSTEM

[75] Inventors: Waldmar Hans, Bamberg; Rudolf Sauer, Renningen; Otto Glöckler, Benningen; Ulrich Steinbrenner, Stuttgart; Dieter Günther, Murr; Manfred Lembke, Gerlingen, all of Fed. Rep. of Germany

[73] Assignee: Robert Bosch GmbH, Stuttgart, Fed. Rep. of Germany

[21] Appl. No.: 62,598

[22] Filed: Jul. 31, 1979

[30] Foreign Application Priority Data

Mar. 2, 1979 [DE] Fed. Rep. of Germany ....... 2908095

[51] Int. Cl.³ .......................... F02M 55/02; B05B 1/14
[52] U.S. Cl. .................................... 123/470; 123/469; 239/550; 239/600
[58] Field of Search ............... 123/470, 471, 468, 469, 123/456; 239/550, 566, 554, 600

[56] References Cited

U.S. PATENT DOCUMENTS 3,776,209  12/1973  Werthfimer ......................... 123/470

FOREIGN PATENT DOCUMENTS 619492   10/1935  Fed. Rep. of Germany ...... 239/550
2655060  6/1978   Fed. Rep. of Germany ...... 239/550
379817   7/1973   U.S.S.R. ............................. 239/550

Primary Examiner—Charles J. Myhre
Assistant Examiner—Carl Stuart Miller
Attorney, Agent, or Firm—Edwin E. Greigg

[57] ABSTRACT

A fuel injection system is proposed for internal combustion engines having a plurality of injection valves for supplying fuel to the engine. Each injection valve is connected by a yieldable support bracket with a rigid fuel distributor line. The bracket is mounted pivotally with an annular coller secured to the injection valve. The fuel distributor line is arranged to engage rib-like carrier members connected with the internal combustion engine and is held against the carrier member by yielding clamp elements. After the valves are engaged in the sockets of the fuel distributor line and the bore of the cylinder head, then the support brackets are swung upwardly to tension the seal elements that are disposed in proximity to the opposite ends of the valve. As a result, not only a more secure connection between the fuel distributor line and the injection valves is obtained, but also rapid assembly or disassembly of the fuel injection system.

10 Claims, 5 Drawing Figures

FUEL INJECTION SYSTEM

BACKGROUND OF THE INVENTION

The invention relates to a fuel injection system of the type described herein and finally claimed. A fuel injection system is already known in which the injection valves are inserted into appropriate openings in the intake pipes, and where the injection valves are firmly held by means of a fuel distributor line provided with appropriate socket elements. In this system, however, there is the danger that under sufficient mechanical stress these socket elements may loosen and the fuel may spray into the engine area and thereby cause a fire. A further disadvantage of this known fuel injection system is that all the injection valves must be inserted seriatim into the connection socket before the support means for the fuel distributor line can be tightened.

OBJECT AND SUMMARY OF THE INVENTION

The fuel injection system in accordance with the invention as claimed herein has the advantage over the prior art that beyond the increased security against loosening of the socket and plug connection provided for between the fuel distributor line and the injection valves, more rapid mounting is also possible, because the injection valves, which are coupled with the fuel distributor line via the yielding support bracket can now be inserted and mounted in the engine as a separately accessible element which can be individually examined and assembled.

Advantageous further embodiments and improvements of the fuel injection system disclosed in the main claim can be attained by means of the features of the dependent claims. Thus, it is of particular advantage to embody the support bracket in the form of a loop and to support it pivotably on the injection valve. In this manner pressure is brought to bear against the injection valve and the fuel distributor line and ultimately the looped portion is received in a depressed area in the fuel distributor line. As a result, there is a secure connection provided between the injection valve and the fuel distributor line, and one which may be quickly established as well as quickly releasable.

It is also advantageous to support the fuel distributor line in a form-locking manner on the carrier members that are connected to the internal combustion engine and to press the fuel distributor line by means of clamps against these carrier members, as a result of which a more secure supporting arrangement is established and rapid assembly and disassembly become possible.

The invention will be better understood as well as further objects and advantages thereof become more apparent from the ensuing detailed description of preferred embodiments taken in conjunction with the drawings.

DESCRIPTION OF THE PREFERRED EMBODIMENTS

Figure 1:
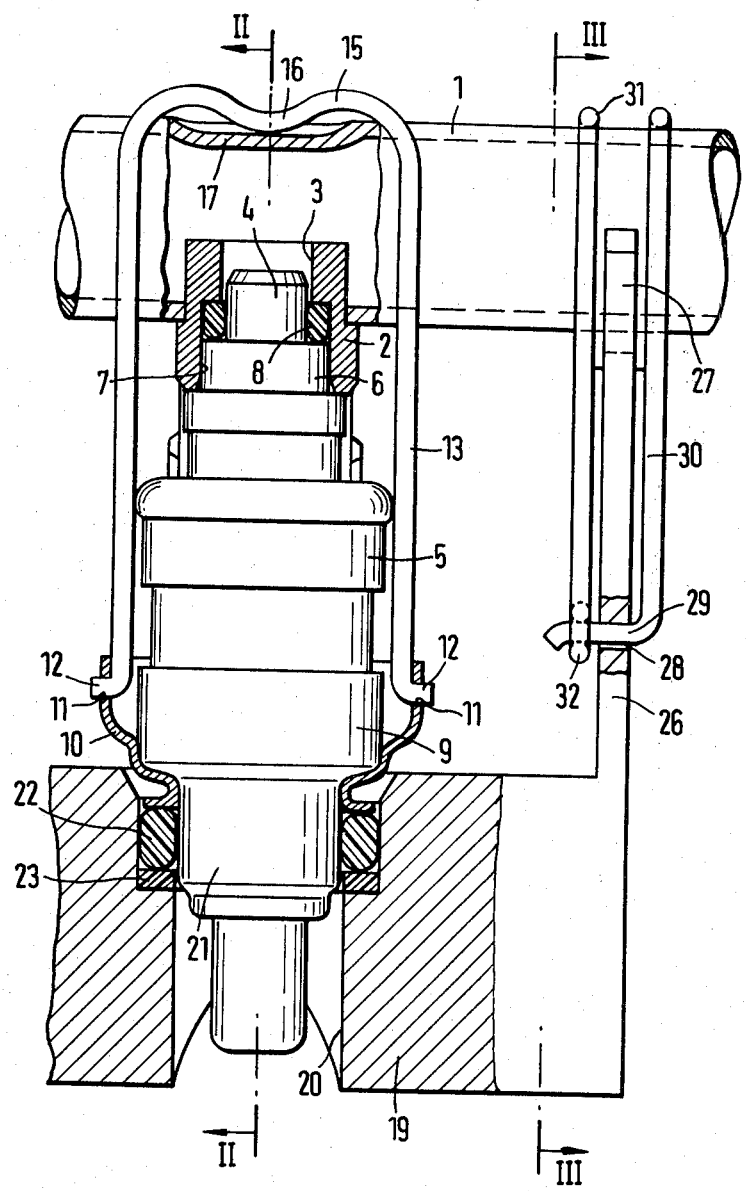
FIG. 1 shows partial elevational and cross-sectional views of a first exemplary embodiment of a fuel injection system.

In the fuel injection system shown in FIG. 1, intended for the operation of an internal combustion engine which is not shown, reference numeral 1 indicates a fuel distributor line which is of rigid construction and made, for example, of metal. The fuel distributor line 1 is connected first with the pressure side of a fuel supply pump, not shown, and second, via a pressure controller, which is also not shown, with the intake side of the fuel supply pump or with the fuel tank. The distributor line 1 is provided with a plurality of openings into which sockets 2 are arranged to be seated and in this way fuel from the fuel distributor line 1 can flow through the bore 3 of each of the sockets 2. A connecting plug 4 of an injection valve 5 is insertable into the internal bore 3 of the socket 2, as shown. In this exemplary embodiment, by way of example, there is shown an electromagnetically actuatable injection valve 5 which is triggerable in a known manner by an electronic control device, not shown, in accordance with operating conditions of the internal combustion engine. One end of the injection valves 5 is guided via a guide portion 6 within a bore 7 of each of the sockets 2. The seal between the socket 2 and the injection valve 5 may be effected in a known manner by means of one or more elastic sealing elements 8, such as an O-ring or other sealing means.

An annular bearing member 10, which is made of suitably rigid sheet metal, for instance, is supported on a flanged area remote from the connecting socket 4 in such a manner that it cannot be displaced in the direction of the connecting socket 4. The annular cup-shaped bearing member 10 is provided with two opposed means defining openings 11 in its upstanding wall which lies in a plane spaced from but parallel to the injection valve 5. A support bracket 13 is provided with a pair of dependent leg members, as shown, each of which have a terminal end portion 12 that is bent at right angles and then inserted into the openings 11 of the annular collar 10. It will be readily understood that the support bracket 13 is pivotably supported relative to the injection valve 5 by the end portions 12. The support bracket 13, which is embodied of spring steel wire, for instance, has a looped portion 15 in the upper area thereof remote from the bearing ends 12. In the assembled condition of the injection valve 5, as shown in FIGS. 1 and 2, this looped portion 15 extends at least half-way around the fuel distributor line 1 and its dependent protrusion or nose portion 16 that is formed by shaping the looped portion 15 is arranged to be received within a detent area of the fuel distributor line 1 embodied as a groove 17.

In the installed condition, the injection valve 5 is therefore pressed under tension against the sealing element 8 by the yielding support bracket 13. Thus, the support bracket 13 provides an easily assemblable support means between the fuel distributor line 1 and each injection valve 5.

Figure 4:
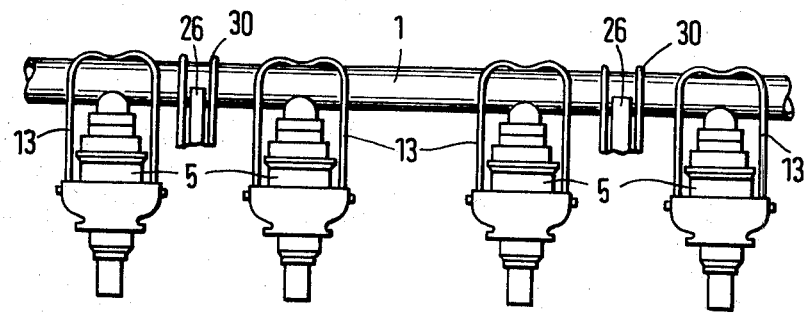
FIG. 4 is a horizontal elevational view of a plurality of injection valves disposed on a fuel distributor line.

In FIG. 4, by way of example, four injection valves 5 are shown, which are secured to the fuel distributor line 1 by means of the holding means described in connection with FIG. 1; that is, by means of the support bracket 13 via sockets 2. The fuel distributor line 1 with the injection valves 5 secured thereon by the support brackets 13 thus represents an element which is individually accessible, examinable and mountable, and which in this assembled state is directly mountable on the engine. Referring again to FIG. 1, openings or bored areas 20 are provided either in the intake pipe 19 or in the cylinders 19 of an internal combustion engine, into which openings 20 the nozzles 21 of the injection valves 5 can be inserted. The fuel can be injected into the intake pipe 19 or the cylinders of the engine via these nozzles 21. At least one elastic sealing element 22 and one insulating element 23 are disposed about the nozzle 21 of each injection valve 5. These elements 22 and 23 are supported on corresponding ledges in each of the openings 20 in the wall of the intake pipe 19 or the wall of the cylinder 19. The insulating element 23 is intended to prevent the transmittal of noises which result from pressure fluctuations from the engine into the fuel injection system.

Figure 2:
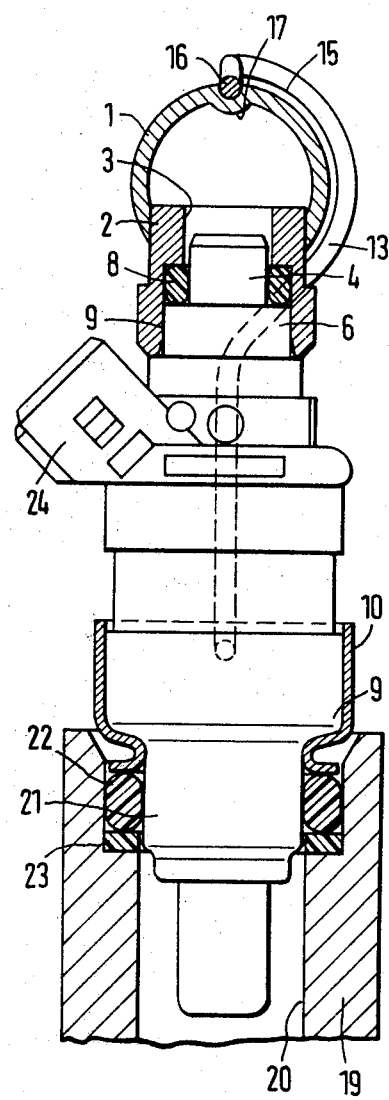
FIG. 2 is a cross-sectional view taken along the line II—II of FIG. 1.

FIG. 2 illustrates the position of the injection valve 5 on the fuel distributor line 1 in accordance with the section taken along the lines II—II of FIG. 1. In particular, the contour of the looped portion 15 of the support bracket 13 is shown by way of example. The electric plug of the injection valve is marked with reference numeral 24.

The embodiment of the support bracket 13 which is shown is to be considered only as an example. The support bracket 13 could be supported equally well on the fuel distributor line 1, and could be arranged to engage the injection valve 5 with an appropriately embodied looped portion on suitably embodied steps, for example. The support bracket could also be embodied in such a manner that it is not sustained pivotably on one end, but rather that, being partially arranged to surround the injection valve 5 and the fuel distributor line 1, it engages suitably embodied detent areas on the injection valve or the fuel distributor line.

Figure 3:
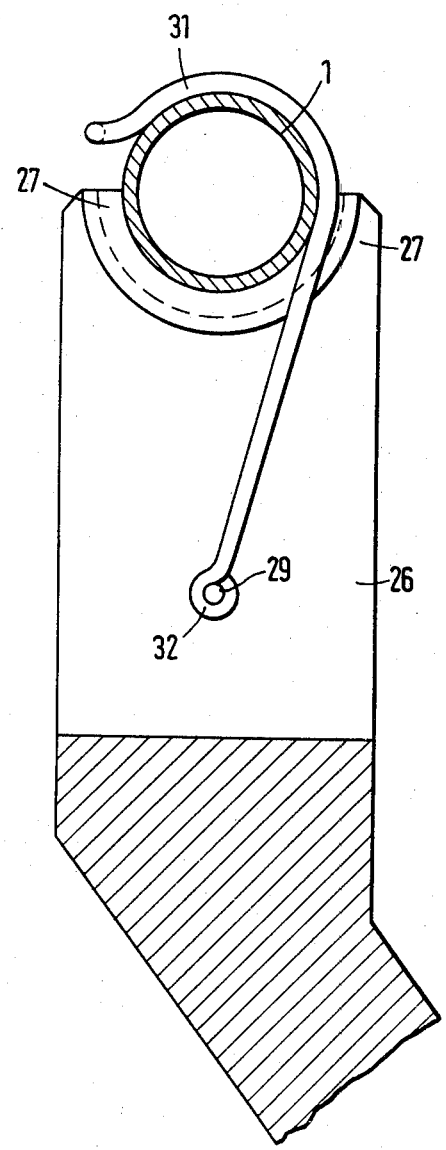
FIG. 3 is a sectional view taken along the line III—III of FIG. 1.

Referring at this time to FIGS. 1, 3 and 4, there it is shown that in an advantageous manner, the fuel distributor line 1 is supported in a form-locking assembly on perpendicularly disposed carriers 26 that are associated with the intake pipe 19. These carrier members are integrated into the cylinder construction or the cylinders 19 of the internal combustion engine in the form of ribs, as clearly shown in the drawings denoted. The carrier members 26 partially surround the lower portion of the fuel distributor line 1 with a concave portion 27 which is oriented toward the fuel distributor line 1. The carrier members 26 each include an aperture 28, into which is inserted an angular leg element 29 of a clamp 30 bent at an angle, as shown. This element is constructed out of spring steel wire.

Thus, from an examination of FIG. 1 the clamp 30 includes parallel spaced portions, one leg of which is arranged to be bent and extend through the aperture 28 in the carrier member with the other end of the leg being bent and provided with a looped zone through which the leg element 29 is adapted to project. Also, as seen in FIGS. 1 and 3, the parallel spaced portions are integrated at the upper area, having been formed from a sturdy spring member with the looped integrated portions arranged to snap around the fuel distributor line 1. (FIG. 3). To prevent the transmission of noise from the internal combustion engine into the fuel injection system and therefrom into the body of the motor vehicle, all the securing points may be insulated from one another by insulating material, which may, for instance, be a plastic coating.

Figure 5:
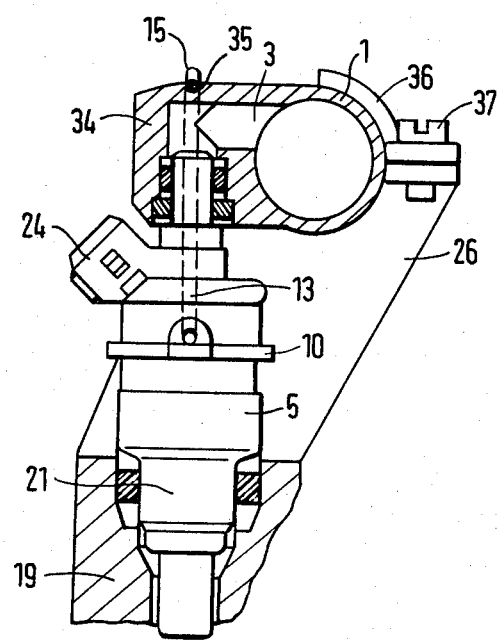
FIG. 5 shows partial elevational and cross-sectional views of a second exemplary embodiment of a fuel injection system.

In the exemplary embodiment of FIG. 5, the socket 34 is integrated into the fuel distributor line 1 and disposed at an angle relative thereto. The axis of the injection valve 5 thus does not extend through the longitudinal axis of the fuel distributor line 1. The support bracket 13, pivotably supported in the ring bearing 10 on the injection valve 5, surrounds the socket 34 with its looped portion 15 and engages a depressed area 35. The fuel distributor line 1 may also be secured on the carrier member 26 by means of a clamping element 36 and a screw connection 37.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A fuel injection system for internal combustion engines including a common fuel distributor line in which:
   said common distributor line includes a plurality of apertures therein;
   a plurality of sockets one each inserted in each of said apertures in said distributor line;
   a plurality of injection valves each including a body portion, an input end and an output end;
   said inlet end of each valve inserted into one each of said sockets;
   means between said injection input end of each of said valves and said sockets for sealing against leakage of fuel;
   said output end of each of said injection valves forming a nozzle element which can be sealably inserted into an appropriate opening correlated with an opening in an intake pipe of an internal combustion engine;
   separate support means, each separate support means supported by said body of one each of said injection valves;
   a support bracket member supported by each of said support means including a portion extending from said support means to said fuel distributor line, and each of said bracket portions extending to said distributor line includes grasping means for grasping said distributor line;
   whereby each of said injection valves are secured to said fuel distributor line in a tight leak-free condition.

2. A fuel injection system in accordance with claim 1, further wherein said bracket member is pivotably supported on said support means on said injection valve.

3. A fuel injection system in accordance with claim 1, further wherein said fuel distributor line is provided with an upwardly extending wall portion, said wall portion having a depression into which said bracket member can engage.

4. A fuel injection system in accordance with claim 3, further wherein said depression in said fuel distributor line comprises a longitudinally extending groove.

5. A fuel injection system in accordance with claim 1, further wherein said support bracket member comprises a spring steel wire.

6. A fuel injection system in accordance with claim 1, further wherein said support means comprises an annular cup-shaped member.

7. A fuel injection system in accordance with claim 1, further wherein said fuel distributor line is arranged to be clamped to carrier means which are associated with said internal combustion engine.

8. A fuel injection system in accordance with claim 7, further wherein said means for securing said fuel distributor line to said carrier means further includes a hook-like portion.

9. A fuel injection system in accordance with claim 8, further wherein said carrier means for said fuel distributor line further includes means for securing said fuel distributor line to said carrier means.

10. A fuel injection system in accordance with claim 4, further wherein said bracket member further includes a length and medially of said length said bracket is provided with a downwardly disposed area that registers with said groove in said fuel distributor line.

* * * * *